F. G. MITCHELL.
WAGON TONGUE YOKE ATTACHING DEVICE.
APPLICATION FILED MAR. 1, 1910.
970,254.
Patented Sept. 13, 1910.
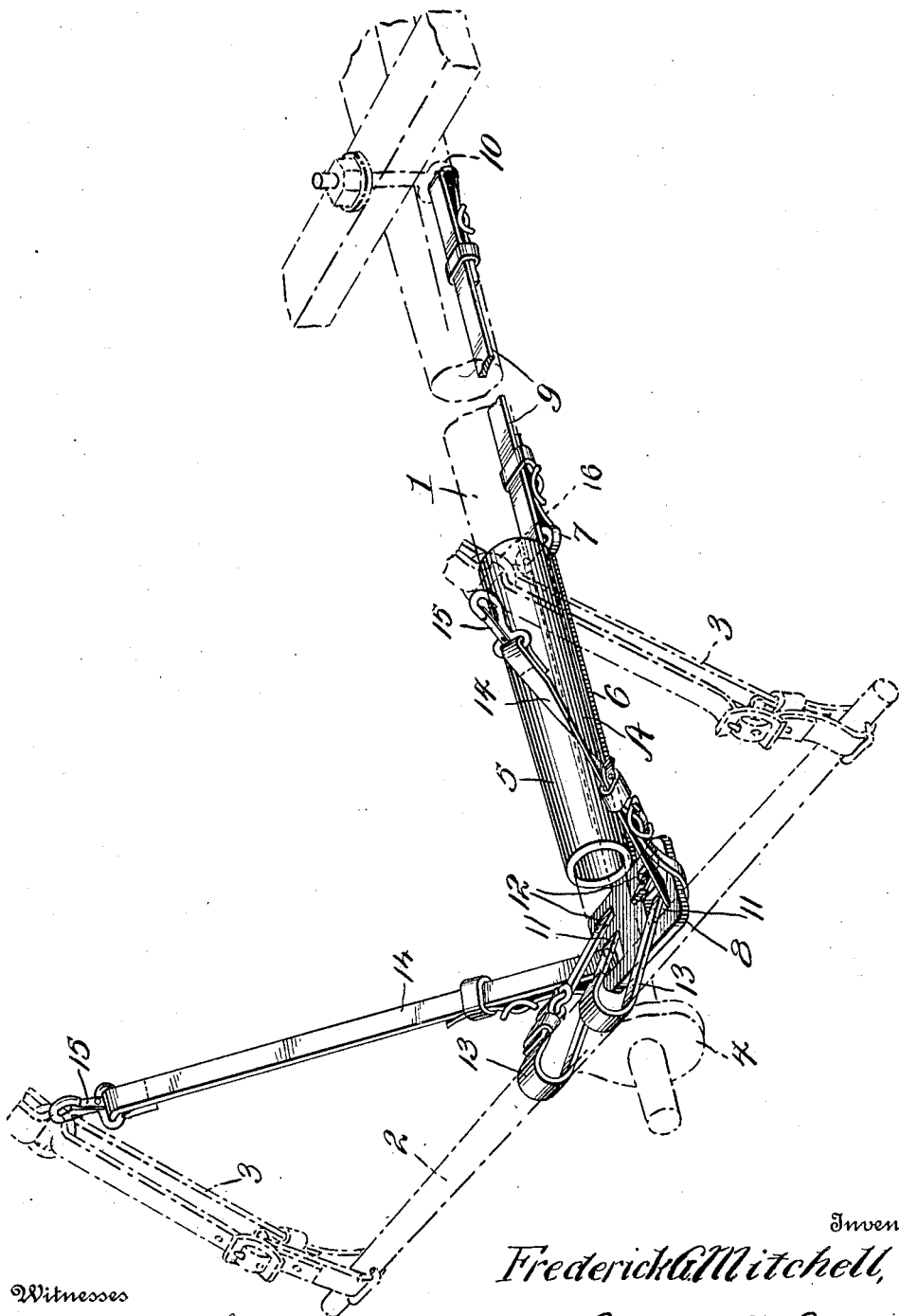
Witnesses
J. T. L. Wright
C. Bradway.
Inventor
Frederick G. Mitchell,
By Victor J. Evans,
Attorney

UNITED STATES PATENT OFFICE.

FREDERICK G. MITCHELL, OF GLENCOE, MARYLAND.

WAGON-TONGUE-YOKE-ATTACHING DEVICE.

970,254.  Specification of Letters Patent.  Patented Sept. 13, 1910.

Application filed March 1, 1910.  Serial No. 546,698.

*To all whom it may concern:*

Be it known that I, FREDERICK G. MITCHELL, a citizen of the United States, residing at Glencoe post-office, in the county of Baltimore and State of Maryland, have invented new and useful Improvements in Wagon-Tongue-Yoke-Attaching Devices, of which the following is a specification.

This invention relates to tongue yokes and more particularly to a means for attaching a yoke to the tongue of a vehicle.

The invention has for its present object to provide a novel yoke and tongue connecting device, whereby the maximum safety is insured so that the driver will have control of the horses at all times even though the yoke should break or a swingletree become deranged or broken.

Another object of the invention is to improve and simplify the construction and operation of devices of this character so as to be comparatively simple and inexpensive to manufacture and of such design as to be used for vehicles already in use.

With these objects in view and others as will appear as the description proceeds, the invention comprises the various novel features of construction and arrangement of parts which will be more fully described hereinafter and set forth with particularity in the claims appended hereto.

In the accompanying drawing which illustrates one embodiment of the invention, the figure is a perspective view of a yoke and tongue with the improvement applied thereto.

Referring to the drawing, 1 designates a tongue, 2 a yoke and 3 the yoke straps for connecting the yoke with the collars on the harness. The yoke has the usual leather collar 4 to fit over the end of the tongue and the yoke and tongue are connected together by an attaching device designated generally by A. This device consists of a leather or other sleeve 5 which tapers so as to fit the tongue and thus prevent rearwardly movement thereon, and secured to this sleeve is an iron strip 6 which has its rear projecting end formed into an eye 7 and its front end formed into a rectangular head 8 that also projects from the sleeve. A strap 9 is connected with the eye 7 and extends rearwardly along the tongue to connect with a bolt 10 which secures the doubletree to the latter so that the sleeve will be prevented from moving forwardly on the tongue. The head 8 is provided with slots 11 and 12 at opposite sides of the center and passing through the slots 12 are straps 13 which form loops engaging over the yoke at points at opposite sides of the tongue. In the openings or slots 11 are straps 14 which are provided with snaps 15 to connect with rings 16 in the yoke straps 3. It will thus be seen that the yoke will be connected by the straps 13 so that the yoke will be prevented from working off the tongue, and the straps 14 form connections between the tongue and harness collars so that in case of breakage of the yoke the horses will still be connected with the tongue. Should a swingletree break, the horses would still remain attached to the vehicle because of the connection between the yoke straps and the device A.

In the case of wagon manufacture, the connecting device can be attached directly and permanently to the tongue without the use of a sleeve and hence the strap 9 can be dispensed with.

From the foregoing description, taken in connection with the accompanying drawing, the advantages of the construction and of the method of operation will be readily apparent to those skilled in the art to which the invention appertains, and while I have described the principle of operation of the invention together with the apparatus which I now consider to be the best embodiment thereof, I desire to have it understood that the apparatus shown is merely illustrative and that such changes may be made when desired as are within the scope of the appended claims.

Having thus described the invention, what I claim as new is:—

1. The combination of a tongue, a yoke, yoke straps connected with the yoke, means for connecting the yoke on the tongue, said means comprising a support surrounding the tongue, an element connected with the support and secured to the rear portion of the tongue to prevent longitudinal movement of the support forwardly, and separate elements extending laterally from and secured directly to the support to connect with the yoke straps adjacent the ends that connect with the harness collars.

2. The combination of a tongue, a yoke having means for fitting the end of the tongue, elements for connecting the yoke with the harness collars, and a device carried by the tongue and serving to retain the yoke thereon, said device including separate elements embracing a yoke and also separate elements for connecting with the first mentioned elements of the yoke.

3. The combination of a tongue, a doubletree, a fastening for securing the latter to the tongue, a yoke supported on the end of the tongue, elements for connecting the yoke with the harness collars, a sleeve surrounding the tongue at a point behind the yoke, means for connecting the sleeve with the fastening between the tongue and doubletree, separate elements connected to the forward end of the sleeve and embracing the yoke at opposite sides of the tongue, and separate elements connecting the sleeve with the elements of the yoke.

4. An attachment of the class described comprising a sleeve, a member secured to the sleeve and having projecting ends, a strap connected with the rear end of the member for connection with a bolt that secures the doubletree to the tongue, straps secured to the forward end of the said member and arranged to embrace the yoke, and elements extending laterally from the forward end of the member for connection with the yoke straps.

In testimony whereof I affix my signature in presence of two witnesses.

FREDERICK G. MITCHELL.

Witnesses:
GEO. L. ANDERSON,
PETER MULCAHY.